United States Patent [19]

O'Connell et al.

[11] Patent Number: 5,224,439
[45] Date of Patent: Jul. 6, 1993

[54] LIGHT-REFLECTIVE WARNING ARROW MOUNT FOR AUTOMOTIVE VEHICLES

[76] Inventors: Danald J. O'Connell, 16 Tarpon Dr., Sea Girt, N.J. 08750; Stephen C. Leahy, 116 Charmuth Rd., Timonium, Md. 21093

[21] Appl. No.: 965,714

[22] Filed: Oct. 23, 1992

[51] Int. Cl.$^5$ ............................ B60Q 7/02; G01D 3/08
[52] U.S. Cl. .................................. 116/201; 2/DIG. 6; 40/591; 40/621
[58] Field of Search ............... 116/28 R, 306; 40/591, 40/621; 2/DIG. 6

[56] References Cited

U.S. PATENT DOCUMENTS

| | | | |
|---|---|---|---|
| 3,276,416 | 10/1966 | Dirks et al. | 116/28 R |
| 3,670,438 | 6/1972 | Carroll et al. | 116/28 R X |
| 4,044,482 | 8/1977 | Mosch | 116/2 R X |
| 4,326,479 | 12/1980 | Walker et al. | 116/200 X |
| 4,531,320 | 7/1985 | James | 40/621 |
| 4,633,215 | 12/1986 | Anders et al. | 116/28 R X |
| 5,046,446 | 9/1991 | Sumrall et al. | 116/28 R X |

Primary Examiner—Daniel M. Yasich
Attorney, Agent, or Firm—Charles I. Brodsky

[57] ABSTRACT

The warning arrow of the present invention is in the nature of a frame to be temporarily mounted either directly to the body of the vehicle or to the underside of its trunk lid. In a preferred embodiment, the warning arrow is composed of a brightly-colored fabric material for high daytime visibility, and with the arrow being outlined by a plurality of light-reflective filaments for nighttime illumination by the beams of oncoming vehicular headlights. In accordance with the invention, a plurality of self-adhering fabric strips couple to the frame of the mount, either to magnetically secure the warning arrow to the body of the vehicle, or to extend it between its raised trunk lid and a point within its then opened trunk.

15 Claims, 2 Drawing Sheets

LIGHT-REFLECTIVE WARNING ARROW MOUNT FOR AUTOMOTIVE VEHICLES

FIELD OF THE INVENTION

This invention relates to warning arrow mounts for automotive vehicles and, more particularly, to such a mount which is especially suited for use by police, fire and emergency medical personnel called upon to an emergency traffic scene, or to an occasion where a disabled motorist is required to pull or push the vehicle over to the side of the road.

BACKGROUND OF THE INVENTION

As is well known and understood, when traffic emergencies call for the deployment of police, fire or emergency medical personnel, some means is required to warn oncoming motorists of that emergency condition, and to divert their motor vehicles away from the lane of traffic where the emergency exists. As is also well known and understood, a comparable situation exists where a motorist pulls off a roadway, parks the vehicle in question, and leaves it sitting there. In those situations, some type of energizing source—be it fuel power or electrical power—is required to warn an oncoming motorist, especially if the emergency situation, or the mere parking on the shoulder of the road, occurs at night. As will also be apparent, any such type of warning indication must be highly visible at extended distances, whether one is concerned with daytime usage or evening usage. It would also be advantageous if any such warning device were self-contained.

SUMMARY OF THE INVENTION

As will become clear from the description that follows, the present invention describes a light-reflective warning arrow mount for automotive vehicles, whether they be cars, buses, trucks, etc. As will be seen, more particularly, the warning arrow mount may be temporarily secured either directly to the body of the vehicle in question, or—in the case of an automobile—to the underside of its trunk lid. In a preferred embodiment, more specifically, the warning arrow of the invention will be seen to be comprised of a brightly colored fabric for high daytime visibility, and with the warning arrow being outlined by a plurality of light-reflective filaments for nighttime illumination by the beams of oncoming vehicular headlights.

In a first of two preferred embodiments to be described, the warning arrow of the invention is in the nature of a frame having a pair of side borders, to rear portions of which a pair of self-adhering securement fabrics are coupled, along with a magnetic backing for temporary securement to the body of the parked, or disabled, motor vehicle on, or alongside, the road. In a second embodiment, to be described, the borders on the rear portion of the fabric frame is arranged to adheringly secure to a plurality of similarly composed fabrics mounted on the underside of the trunk lid of an automobile when not in use, and to then be detached from one location, and then attached within the trunk adjacent to its included taillights, so as to be held in vertical extension when deployed for use.

As will be further described, the brightly colored fabric for daytime visibility may be composed from a solid polyester film, and held to the frame in any appropriate manner. Surrounding the edge portions which define such warning arrow, the light-reflective filaments will be seen to run—illustratively fabricated from SCOTCHLITE reflective fabric as marketed by the Minnesota Manufacturing and Mining Company (3M). Experimentation has shown that when such fabric is drawn into a filament—even if only of a width of 0.015 inches,—nighttime illumination by oncoming headlights are effective in making such a warning arrow visible at distances of 1,000 feet and more. As will also be described, further advantages follow from having the fabric material frame composed of an open-mesh construction, so as to allow air to pass through in the face of air currents or winds, in preventing the fabric from flapping about, or tearing during use. Obviously, being in the shape of an arrow, the frame mount of the invention can be oriented so that the arrow points to the left, or to the right, as the needs of the situation require, simply by a reversal of its securement.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE DRAWINGS

Figure 1:
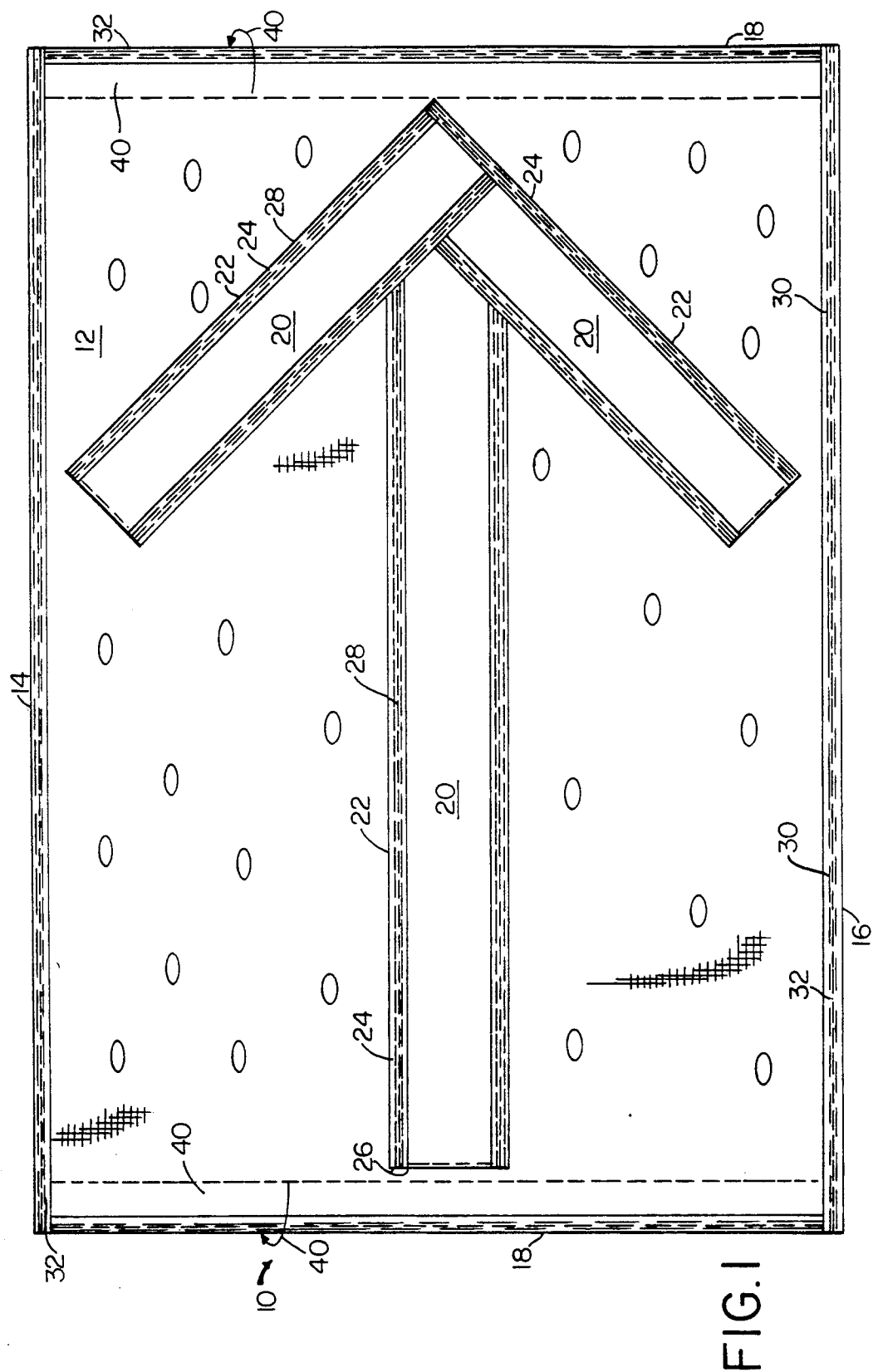
FIG. 1 is a pictorial representation of a warning arrow mount constructed in accordance with the invention.

In FIG. 1 the warning arrow mount 10, in a preferred embodiment, is shown as comprising a frame of first fabric material 12 having top bottom and side edge borders 14, 16, 18, respectively. So as to allow air to pass through when deployed—and so as to prevent the fabric from flapping about and ultimately tearing in the face of air currents or winds when in use—the material 12 is preferably composed of an open-mesh material—for example of a polypropylene film, preferably with an acrylic coating. As is well known, such open-mesh fabric typically comes in an orange, or white coloration—and, in accordance with the invention, an orange coloration is preferable for ease of visibility.

As will also be seen from FIG. 1, the warning mount of the invention also includes a second, fabric material 20 on the frame 12, in the configuration of an "arrow" having defined edge portions 22. In accordance with the invention, and to have such defined arrow 20 as highly visible during daytime illuminations, the fabric material 20 is selected of a solid polyester—preferably colored "yellow" to provide a high degree of contrast with the orange mesh 12.

Also shown in FIG. 1 are a plurality of light-reflective filaments running along at least some of the defined edge portions 22 of the arrow fabric 20. Such filaments 24 may be fabricated from a sheet of SCOTCHLITE reflective material obtained from 3M Company—generally available in 42 inch size widths—and then woven and refined in size to a filament of approximately 0.015 inch width, displaced longitudinally of the order of 1/16 inches. As shown, and in accordance with the present invention, such filaments 24, when woven into a black polyester fabric 28 to run along the edge portions 22, have been observed to present a highly illuminated configuration of the arrow when lit up by the headlights of oncoming motor vehicles at night, at distances of 1,000 feet and more. FIG. 1 illustrates these filaments 24 extending in three parallel rows 26 within the polyester fabric 28. As will be appreciated, the solid polyester material 20 can be simply stitched to the open-mesh material 12, and the polyester material 28 can easily be stitched at the defined edge portions of the polyester material 20.

In one embodiment of the invention, the polyester fabric 28 was selected approximately 3/16 inch in width overall, for use with a defined arrow configuration of approximately 3½ inches wide.

As will be appreciated by those skilled in the art, it is not necessary to include any of the light-reflective filaments within the solid polyester arrow material 20, as the illumination of the surrounding filaments 24 creates a "glow" within the confines of the arrow in and of themselves. In similar manner, incorporating such filaments in the solid material 20 does not produce any measurable effect during daytime hours, as there exists an absence of any headlight illumination to power the tiny silver beads which make up the SCOTCHLITE filaments.

Also shown in FIG. 1—as yet another feature of the invention—is a second pattern of light-reflective filaments 30, woven into a fabric 32—preferably polyester—which secure to the top 14, bottom 16 and side edge borders 18 of the fabric 12. Here, the filaments 30 may be of identical width—0.015 inches—as that of the filaments 24, and similarly woven into a black polyester fabric surround 32. When incorporated as such, oncoming headlight illumination at nighttime serves to not only provide a brightly-lit arrow, but to set off the frame which surrounds it, of an equal brightness, to advise oncoming motorists of a disabled vehicle, or emergency situation at the side of a road, and as a warning to change lanes in the direction of the pointing arrow. Obviously, if the vehicle parked on the side of the road, or otherwise disabled, were at the right-hand portion of the street or highway, the arrow could then point "left"; obviously, if the emergency situation, etc. existed at the left-hand portion of the street or highway, the arrow could be made to point "right", merely by reversing the orientation of the warning arrow mount shown in FIG. 1.

Figure 2:
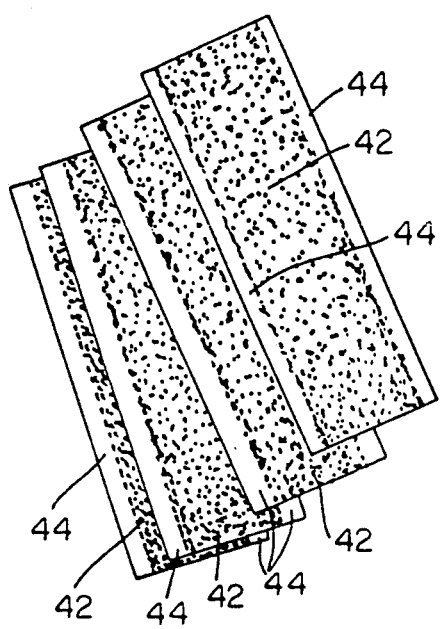
FIG. 2 shows four of ten self-adhering securement fabrics as may be provided in accordance with the use of the invention.
Figure 3:
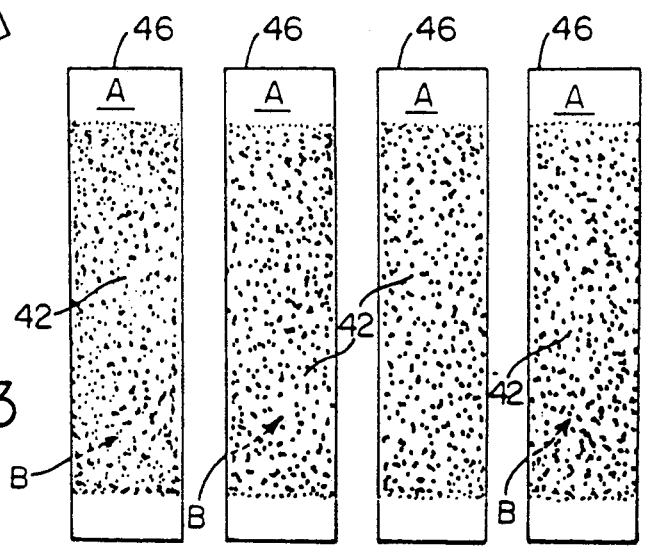
FIG. 3 illustrates four magnetic strips operative with the self-adhering securement fabrics of FIG. 2 in an understanding of the invention as used in one preferred manner of its operation.
Figure 4:
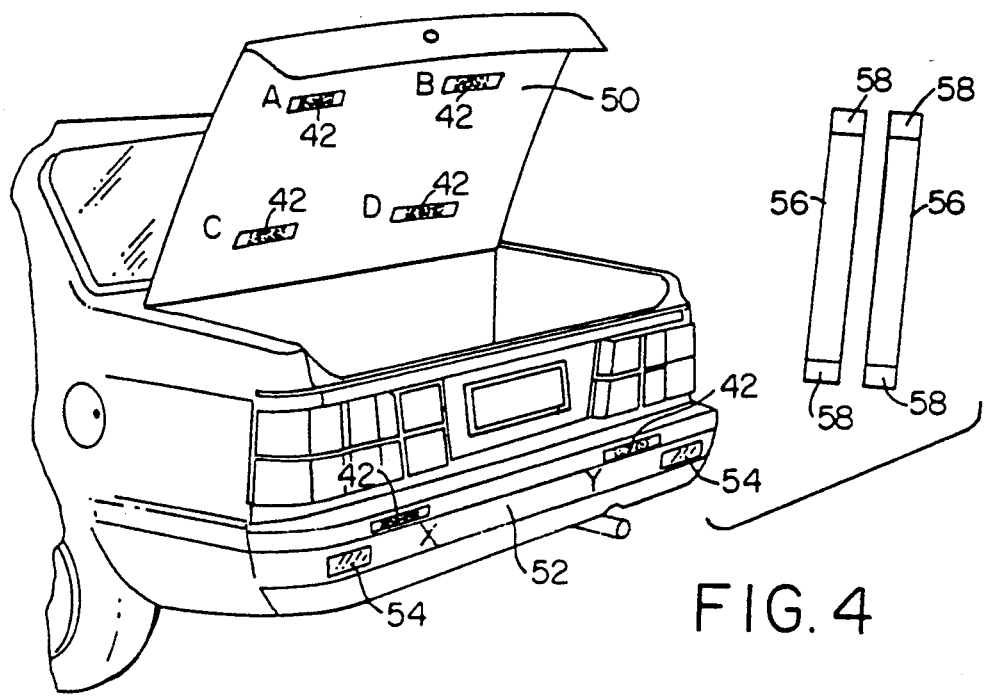
FIG. 4 shows a pair of elongated self-adhering fabrics helpful in an understanding of the invention along with the remaining six of the self-adhering securement fabrics of FIG. 2 for use with the invention.

FIGS. 2-4 are helpful in understanding the ways in which the warning arrow mount of FIG. 1 can be secured to a motor vehicle. In appreciating these drawings, it is first to be understood that a pair of self-adhering-securement fabrics are incorporated at least at the side edge borders 18 of the fabric material frame 12, at the rear locations thereon. Generally denoted by the reference numeral 40, such pair of self-adhering securement fabrics may be of a VELCRO stripping, and of an approximately 1¼ inch width, preferably running the entire length of the side edge border 18. With such understanding, reference is had to FIG. 2, which illustrates four self-adhering fabric strips of comparable VELCRO manufacture, provided along with six other such fabric strips as part of an overall package including the warning arrow mount 10, along with its attendant parts, as shown in FIG. 1. As will be appreciated, each of these self-adhering strips 42 is provided with a protective paper coating 44 adhesively secured in detachable manner to one side of the securement. Such securements 42 will be appreciated, from the description that follows, to be operable with the warning mounting arrangements of FIGS. 3 and 4.

Thus, and more particularly, FIG. 3 illustrates four magnetic strips 46 useful when it is desired to mount the warning arrow of FIG. 1 to the body of the motor vehicle—as to the rear of a bus, to the rear of a truck, to the rear of a van, etc. In such arrangement, the protective paper backing 44 is peeled from each of the four securements 42 of FIG. 2, and where they are then adhesively secured to a first side A of a magnetic strip 46. The opposite side of the self-adhering strip 42 is then detachably coupled to the self-adhering VELCRO strip 40 on the warning arrow mount, at each of its rear corners, and the magnetic side B of the strips 46 then oriented to secure the body of whatever motor vehicle is involved, with the arrow then pointing in the appropriate direction, as needed. In such manner, the "A" of the magnetic strip 46 is then detachably secured to the self-adhering fabric strips 40 on the warning arrow mount, while the magnetic side "B" of the strips 46 is affixed to the vehicle in question.

FIG. 4 is helpful in understanding how the remaining six of the self-adhering fabric securements provided as part of the invention package may be employed. Specifically, and again referring to FIG. 2 as well as to FIG. 4 after their protective paper backings 44 are each removed, the exposed adhesive side can be secured with four of the six to the underside of the trunk lid 50 of an automobile, and so that the self-adhering fabric sides are exposed at the locations A, B, C, D. The remaining two self-adhering securement fabrics 42 can likewise have their protective paper backings 44 removed, with those two securements then being adhesively coupled on an inside vertical wall of the trunk 52, at the locations X, Y, adjacent to the vehicle's taillights 54. To carry out the teachings of the invention here, a further pair of elongated fabrics 56 are provided, with their own self-adhering fabric securements so as to detachably couple substantially along the lengths of the self-adhering strips 40 at the rear of the fabric mounting frame material 12. In accordance with this usage the invention, these additional elongated fabrics 56 extend beyond the lengths of the self-adhering fabric strips 40 and carry at their own respective ends 58 their own self-adhering fabric securements at a position, and with an orientation, so as to secure to the self-adhering fabrics 42 at the locations A, B, C, D in the trunk lid 50 at a time when the warning arrow mount is not intended for use. During such occasions, then, the warning arrow fabric 12 just rests in place, attached to the underside of the trunk lid 50, and with the lid closed.

However, on those occasions when it is desired to mount the warning arrow—as when the vehicle is parked alongside the road, or off the road, and advice is to be given to following motor vehicles to change lanes-,—the self-adhering fabric securement ends 58 can simply be detached from the self-adhering fabrics 42 at the locations A, B in the trunk lid 50, with the elongated fabric strips 56 then just being pulled down so as to align the fabric securements at their respective ends 58 with the self-adhering fabrics 42 at the locations X, Y at the vertical wall 52 by the automobile trunk. In such manner, the resulting warning arrow mount then will be seen to stand vertically, within the trunk, with the lid raised, and yet highly visible to oncoming traffic during daylight hours, or upon reflection from oncoming headlight beams at night. As will be appreciated by those skilled in the art, the open-mesh arrangement of the fabric 12, in this context, allows air to pass through the vertically deployed sign even in this highway environment, where strong air currents and winds oftentimes exist as vehicles pass by at high speeds. Although suitable for use by just the ordinary motorist to indicate that his, or her, vehicle is disabled, or just parked—and that an oncoming driver should change lanes,—it will be understandable that this type of warning arrow mount could be carried equally as well in the trunks of police vehicles and by emergency medical personnel, who park behind the disabled vehicle, or at an accident scene, to advise oncoming traffic of a need to change lanes.

While there have been described what are considered to be preferred embodiments of the present invention, it will be readily appreciated by those skilled in the art that modifications can be made without departing from the scope of the teachings herein of allowing the provision of a flat warning sign that can be placed on trucks or any other type of vehicle, and to alert oncoming traffic during daytime or nighttime, without the use of flares, without the use of electrical batteries to provide illumination, and without the need for any other type of generating equipment. When mounted in an automobile, the warning arrow can be kept in place adjacent the trunk lid, only to be used when necessary, and then arranged to be swung into position. If occasions warrant the need to orient such a sign on the side of the vehicle, for example, then the magnetic arrangements can be used, with the operator merely taking them from a glove compartment where they are kept for such an emergency. With the "dual-system" of the invention, the warning arrow mount can be accomplished either using the VELCRO suspension systems, or with the provided magnet arrangements, simply as the situations require. High intensity arrow colorations afford extended visibilities during daytime activities, and the light-reflective characteristics of the SCOTCHLITE bead filaments employed satisfy the nighttime needs. Understanding, furthermore, that the use of the light-reflective materials appear as a border running along the defined edge portions of the arrow, as described above, one skilled in the art can easily appreciate how such a similar arrangement can be used to surround and illuminate other types of highway warning signage that a vehicle might carry, for both daytime and nighttime illumination—as by illuminating the configuration of a gasoline pump or of a lightning bolt to advise oncoming motorists that the vehicle at the side of the road is parked there because of the need for fuel or an electric start to enable the vehicle to proceed on its way once again, for example. For at least such reasons, therefore, resort should be had to the claims appended hereto for a true understanding of the scope of the invention.

We claim:

1. A warning arrow comprising:
    a frame of first fabric material having top, bottom and side edge borders;
    a second fabric material on said frame in the configuration of an arrow having defined edge portions;
    a plurality of light-reflective filaments running along at least some of said defined edge portions of said arrow fabric material; and
    a pair of self-adhering securement fabrics at said edge borders of said frame, at rear locations thereon.

2. The warning arrow of claim 1 wherein said second fabric material is brightly colored for high daytime visibility.

3. The warning arrow of claim 2 wherein said second fabric material is composed from a solid polyester film.

4. The warning arrow of claim 1 wherein said fabric material frame is composed from an open-mesh fabric.

5. The warning arrow of claim 4 wherein said first fabric material is composed from a polypropylene film with an acrylic coating.

6. The warning arrow of claim 1 wherein said light-reflective filaments are approximately 0.015 inches in width.

7. The warning arrow of claim 6 wherein said light-reflective filaments are woven into a polyester fabric.

8. The warning arrow of claim 1, also including a second plurality of light-reflective filaments running along said top, bottom and side edge borders of said frame of first fabric material.

9. The warning arrow of claim 8 wherein said light-reflective filaments are approximately 0.015 inches in width.

10. The warning arrow of claim 1 wherein said pair of self-adhering securement fabrics are situated at said side edge borders of said frame of first fabric material.

11. The warning arrow of claim 10, further including at least a pair of magnetic strips having a magnetized surface on a first side thereof and a self-adhering securement fabric on an opposite side thereof, to detachably couple with said pair of self-adhering securement fabrics situated at said side edge borders of said frame of first fabric material.

12. The warning arrow of claim 10, further including four magnetic strips having a magnetized surface on a first side thereof and a self-adhering securement fabric on an opposite side thereof, to detachably couple with opposing ends of said pair of self-adhering securement fabrics situated at said side edge borders of said frame of first fabric material.

13. The warning arrow of claim 10, further including a pair of elongated fabrics adheringly secured to said frame of first fabric material substantially along the lengths of said pair of self-adhering securement fabrics and extending beyond said lengths, and with said pair of elongated fabrics each including their own self-adhering securing fabrics at the ends thereof.

14. The warning arrow of claim 13, further including at least a second pair of self-adhering securing fabrics, each having an adhesive surface on one side thereof, for detachably coupling to one end of each of said pair of elongated fabrics.

15. The warning arrow of claim 13, further including three additional pairs of self-adhering securing fabrics, each having an adhesive surface on one side thereof, for detachably coupling to both ends of each of said pair of elongated fabrics.

* * * * *